United States Patent Office 2,817,590
Patented Dec. 24, 1957

2,817,590

CHEESE PRODUCT

Edwin Traisman, Des Plaines, and Wallace Kurtzhalts, Wheeling, Ill., assignors to National Dairy Products Corporation, a corporation of Delaware No Drawing. Application August 9, 1954
Serial No. 448,764

3 Claims. (Cl. 99—117)

The present invention is concerned with an improved cheese product and is particularly concerned with an improved grated cheese composition containing American-type cheese.

Grated cheese products have become increasingly important commercially in recent years. These products are frequently packaged alone to be used as seasonings for foods, such as soups, or packaged in combination with macaroni, spaghetti, and the like to provide dinners. It has been found however, that grated cheese products are likely to lose some of their cheese flavor after storage. Naturally, this is a disadvantage in merchandising products of this type.

Attempts have been made to preserve the flavor by adding various materials but such additions have either failed to preserve the flavor or have contaminated the cheese flavor by their presence.

One of the objects of the present invention is to provide an improved grated cheese product which has more substantial cheese flavor.

Another object of the invention is to provide a cheese composition containing grated cheese which retains its characteristic cheese flavor for extended periods of time.

The present invention is based upon the discovery that cheese flavor can be maintained in grated cheese of the American-type and to other types of cheeses, if the grated cheese is combined with a small but particular amount of yeast. The term "yeast" as used in connection with this invention is intended to mean the cells and spores of *Saccharomyces cerevisiae* containing various enzymes such as zymases which are capable of converting glucose and other carbohydrates into lower compounds of carbon. For the purpose of the present invention, the use of dried brewer's yeast is preferred.

The yeast in the present invention is not employed for its leavening properties, so that a relatively inactive form of the yeast may be employed. The yeast also does not appear to ripen the cheese or metabolize. For satisfactory results, at least about 2 percent and not more than about 5 percent by weight of the yeast should be combined with the grated cheese. When less than about 2 percent, by weight, the yeast is ineffective and does not enhance the flavor of the grated cheese product, while at yeast contents of greater than about 5 percent, the resulting product is objectionable and a good cheese flavor is not provided. In the range from 2 percent to 5 percent by weight, the chemical or physical effect of the yeast is not known but it has a synergistic effect on the grated cheese flavor, enhancing the flavor and enabling the cheese to be effectively used for longer periods of time. At the same time, there is no yeast-like flavor produced within the specified range of yeast contents.

The composition of the present invention is illustrated in the following specific example.

*Example*

Approximately 97 pounds of finely grated American-type cheese was combined, by mechanical mixing, with about 3 pounds of dried brewer's yeast.

It was found that the mixture had enhanced cheese flavor not possessed by the grated cheese alone, and that this flavor was retained for longer periods of time than was possible with the cheese, alone, under the same storage conditions.

While the beneficial results achieved from addition yeast are obtained over a wide range of particle sizes, provided there is a relatively homogeneous mixture provided between the cheese particles and the yeast particles, the best results are obtained when the particle size of the yeast and cheese is less than about 40 mesh.

It will be evident that various modifications can be made to the described embodiment without departing from the scope of the present invention.

We claim:

1. The method of enhancing the flavor of a grated American cheese composition and rendering the composition storage stable, which method includes preparing grated American cheese in particle form, preparing in particle form a yeast having a yeasty flavor, dry mixing at least about 2 percent and not more than about 5 percent, by weight of the final composition, of said yeast with said grated cheese, and maintaining said yeast and said cheese together in dry particle form to provide a composition having an enhanced cheese flavor in the absence of any accompanying yeast-like flavor.

2. The method of enhancing the flavor of a grated American cheese composition and rendering the composition storage stable, which method includes preparing grated American cheese in particle form, preparing in particle form of particle size less than 40 mesh a yeast having a yeasty flavor, dry mixing at least about 2 percent and not more than about 5 percent, by weight of the final composition, of said yeast with said grated American cheese, and maintaining said yeast and said cheese together in dry particle form to provide a composition having an enhanced flavor in the absence of any accompanying yeast-like flavor.

3. The method of enhancing the flavor of a grated American cheese composition and rendering the composition storage stable, which method includes preparing grated American cheese in particle form, preparing dried brewer's yeast having a yeasty flavor in particle form of particle size less than 40 mesh, dry mixing at least about 2 percent and not more than about 5 percent, by weight, of the final composition of said yeast with said grated American cheese, and maintaining said cheese and said yeast together in dry particle form to provide a composition having an enhanced flavor in the absence of any accompanying yeast-like flavor.

References Cited in the file of this patent

UNITED STATES PATENTS

| 1,590,837 | Liebers | June 29, 1926 |
| 1,708,914 | Dass | Apr. 9, 1929 |
| 1,736,657 | Massatsch | Nov. 19, 1929 |
| 1,981,225 | Freshel | Nov. 20, 1934 |

FOREIGN PATENTS

| 755,931 | France | May 23, 1933 |

OTHER REFERENCES

Canning Age, December 1942, page 686.